(12) United States Patent
Szczerba et al.

(10) Patent No.: US 11,840,144 B2
(45) Date of Patent: Dec. 12, 2023

(54) DEPLOYABLE ROLLABLE DISPLAY FOR A VEHICLE

(71) Applicant: GM Global Technology Operations LLC, Detroit, MI (US)

(72) Inventors: Joseph F. Szczerba, Grand Blanc, MI (US); Ki Hyun Ahn, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 17/386,945

(22) Filed: Jul. 28, 2021

(65) Prior Publication Data

US 2023/0031862 A1 Feb. 2, 2023

(51) Int. Cl.
*B60K 35/00* (2006.01)
*B60K 15/00* (2006.01)
*G09F 9/30* (2006.01)

(52) U.S. Cl.
CPC ............ *B60K 15/00* (2013.01); *G09F 9/301* (2013.01); *B60K 2370/52* (2019.05); *B60K 2370/67* (2019.05)

(58) Field of Classification Search
None
See application file for complete search history.

(56) References Cited

U.S. PATENT DOCUMENTS

| 7,900,988 | B2 * | 3/2011 | Ryu ................ B60R 11/0235 455/345 |
| 9,956,898 | B1 * | 5/2018 | Dellock ................ B60N 2/91 |
| 10,325,567 | B2 * | 6/2019 | Heo ..................... G09G 5/003 |
| 10,351,001 | B2 * | 7/2019 | Beauregard ............ B60K 37/02 |
| 10,545,336 | B2 * | 1/2020 | Dubey ..................... H10K 59/50 |
| 10,696,162 | B2 * | 6/2020 | Benchikhi .............. B60K 37/04 |
| 10,710,458 | B2 * | 7/2020 | Hélot ..................... B60K 37/00 |
| 10,766,365 | B2 * | 9/2020 | Pegorier ............ B60R 13/0256 |
| 10,800,305 | B2 * | 10/2020 | Garcia Sanchez .... B60R 21/026 |
| 10,926,640 | B2 * | 2/2021 | Dinant .................... B60R 13/02 |
| 2006/0131088 | A1 * | 6/2006 | Pawusch ................ B60K 35/00 180/90 |
| 2009/0128307 | A1 * | 5/2009 | Hentsch .................. B60K 35/00 340/425.5 |
| 2009/0161302 | A1 * | 6/2009 | Ferren .................. B60R 11/0235 361/679.01 |
| 2009/0256813 | A1 * | 10/2009 | Amici .................. G06F 3/04883 345/173 |
| 2014/0043269 | A1 * | 2/2014 | Kuhn ...................... G06F 3/041 345/173 |
| 2017/0166057 | A1 * | 6/2017 | Murray ............... G06F 3/04842 |
| 2018/0181359 | A1 * | 6/2018 | Monroe ................... B60Q 3/80 |
| 2019/0041222 | A1 * | 2/2019 | Grewal .................. B60K 37/06 |
| 2020/0233216 | A1 * | 7/2020 | Liesener ................... B60R 1/12 |
| 2021/0212223 | A1 * | 7/2021 | Song ..................... H05K 5/0017 |
| 2022/0035156 | A1 * | 2/2022 | Helot ..................... B60K 37/02 |
| 2022/0135112 | A1 * | 5/2022 | Harmon ................. B62D 1/183 180/334 |

\* cited by examiner

*Primary Examiner* — Xanthia C Relford
(74) *Attorney, Agent, or Firm* — CANTOR COLBURN LLP

(57) ABSTRACT

A deployable rollable display for a vehicle includes a vehicle component having at least one surface. A guide track is provided in the at least one surface. A screen deployment member is selectively shiftable through the at least one surface and along the guide track. A rollable display is spooled onto the screen deployment member.

20 Claims, 5 Drawing Sheets

US 11,840,144 B2

DEPLOYABLE ROLLABLE DISPLAY FOR A VEHICLE

INTRODUCTION

The subject disclosure relates to the art of deployable displays and, more particularly, to a deployable, rollable display for a vehicle.

Vehicles include one or more displays that provide information to operators and, in some instances, passengers. Typically, screens are positioned directly in front of the operator, such as an instrument cluster, and in some cases between the operator and the passenger, such as an infotainment system. Displays may also be provided in other areas of a vehicle to present, for example, movies to rear seat passengers.

Often times, there is not enough room to present all desired information on an instrument cluster, further, a display on an infotainment system may, at times, be difficult to perceive by an operator. Route information, contacts, preferences may therefore be difficult to perceive, select, and/or view easily by the operator and the passenger. Positioning an infotainment screen that is accessible and perceivable by both the operator and a passenger is difficult. Accordingly, it is desirable to provide a display that is readily adaptable, moveable, and reconfigurable in order to provide desired information to operators and passengers.

SUMMARY

Disclosed is a deployable rollable display for a vehicle including a vehicle component having at least one surface. A guide track is provided in the at least one surface. A screen deployment member is selectively shiftable through the at least one surface and along the guide track. A rollable display is spooled onto the screen deployment member.

In addition to one or more of the features described above or below, or as an alternative, further embodiments could include wherein the guide track is substantially linear.

In addition to one or more of the features described above or below, or as an alternative, further embodiments could include wherein the guide track is non-linear.

In addition to one or more of the features described above or below, or as an alternative, further embodiments could include wherein the non-linear guide track has an oval shape.

In addition to one or more of the features described above or below, or as an alternative, further embodiments could include wherein the guide track includes a substantially linear portion and a non-linear portion.

In addition to one or more of the features described above or below, or as an alternative, further embodiments could include wherein the screen deployment member includes a first post and a second post that is moveable along the guide track relative to the first post to unspool the display.

In addition to one or more of the features described above or below, or as an alternative, further embodiments could include wherein the each of the first post and the second post is shiftable along the guide track.

In addition to one or more of the features described above or below, or as an alternative, further embodiments could include wherein the rollable display includes a first viewable surface and a second viewable surface.

In addition to one or more of the features described above or below, or as an alternative, further embodiments could include wherein the second viewable surface is perceivable through the first viewable surface.

In addition to one or more of the features described above or below, or as an alternative, further embodiments could include wherein the at least one surface is an upper surface.

In addition to one or more of the features described above or below, or as an alternative, further embodiments could include wherein the at least one surface includes a first surface defining an upper surface and a second surface defining a lower surface.

Also disclosed is a vehicle including a body defining a passenger compartment. A component is positioned in the passenger compartment. The component includes at least one surface. A guide track is provided in the at least one surface. A screen deployment member is selectively shiftable through the at least one surface and along the guide track. A rollable display is spooled onto the screen deployment member.

In addition to one or more of the features described above or below, or as an alternative, further embodiments could include wherein the guide track is substantially linear.

In addition to one or more of the features described above or below, or as an alternative, further embodiments could include wherein the guide track is non-linear.

In addition to one or more of the features described above or below, or as an alternative, further embodiments could include wherein the guide track includes a substantially linear portion and a non-linear portion.

In addition to one or more of the features described above or below, or as an alternative, further embodiments could include wherein the screen deployment member includes a first post and a second post that is moveable along the guide track relative to the first post to unspool the display.

In addition to one or more of the features described above or below, or as an alternative, further embodiments could include wherein the each of the first post and the second post is shiftable along the guide track.

In addition to one or more of the features described above or below, or as an alternative, further embodiments could include wherein the rollable display includes a first viewable surface and a second viewable surface.

In addition to one or more of the features described above or below, or as an alternative, further embodiments could include wherein the at least one surface is an upper surface.

In addition to one or more of the features described above or below, or as an alternative, further embodiments could include wherein the at least one surface includes a first surface defining an upper surface and a second surface defining a lower surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
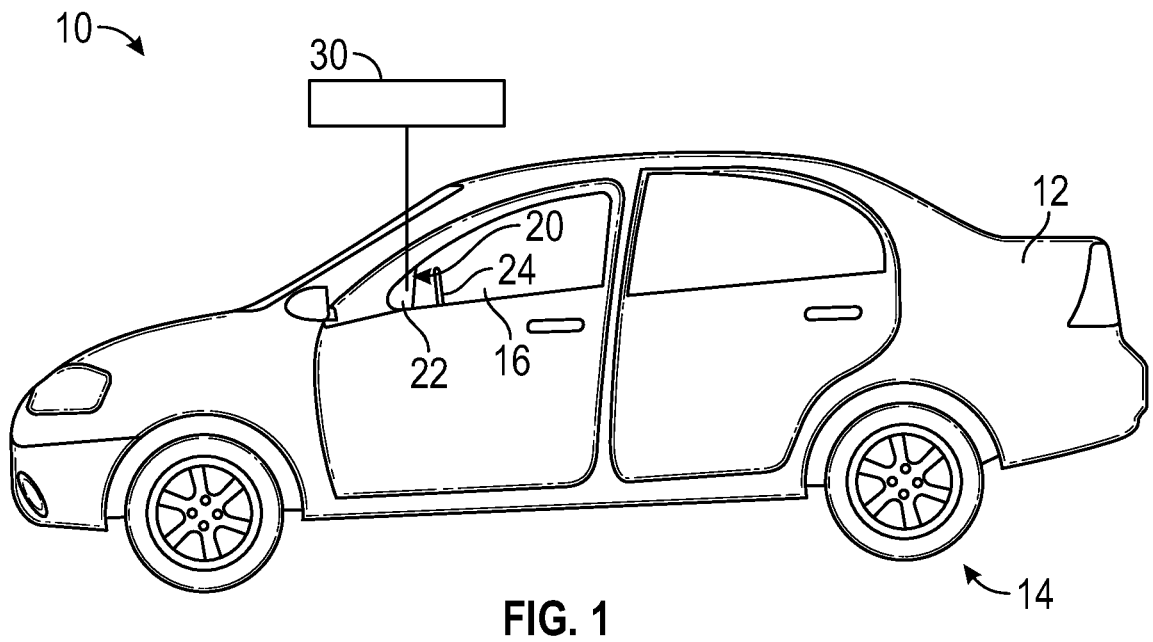
FIG. 1 depicts a vehicle including a deployable, rollable display, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle 10, in accordance with a non-limiting example, is indicated generally in FIG. 1. Vehicle 10 includes a body 12 that sits upon a chassis (not shown) which supports a plurality of wheels, indicated generally at 14. Body 12 defines a passenger compartment 16 including a vehicle component 20. Vehicle component 20 may take on various forms including head rests, center consoles, door frames, roof structure and the like. In the non-limiting example shown, vehicle component 20 takes the form of a dashboard 22 housing a vehicle gauge set (not shown) positioned behind and/or above a steering wheel 24.

Figure 2:
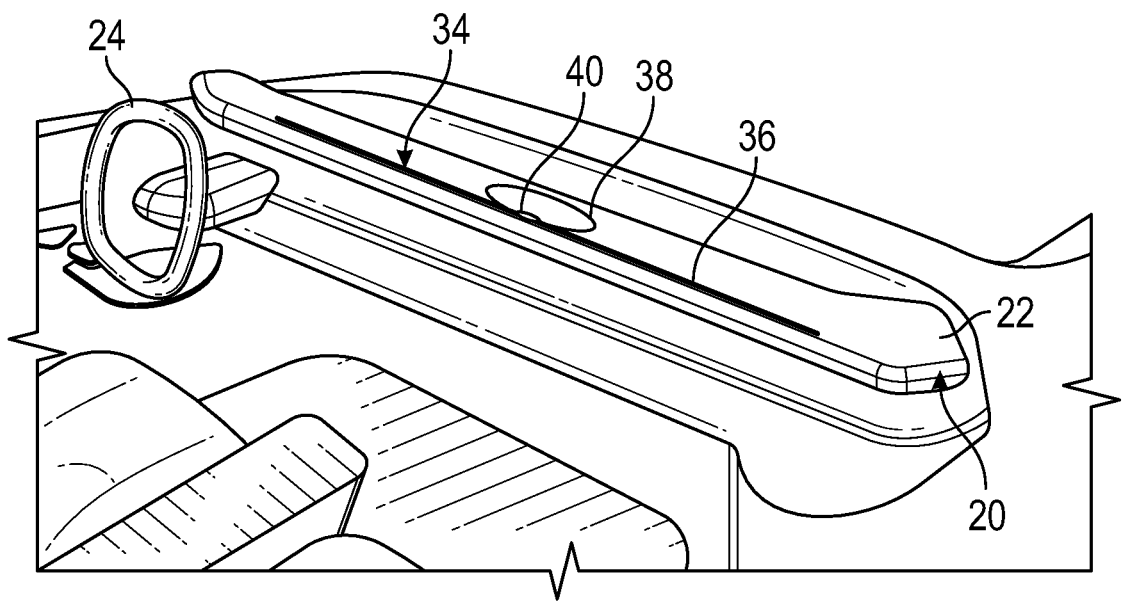
FIG. 2 depicts a vehicle component including a guide track for the deployable, rollable display, in accordance with a non-limiting example.
Figure 3:
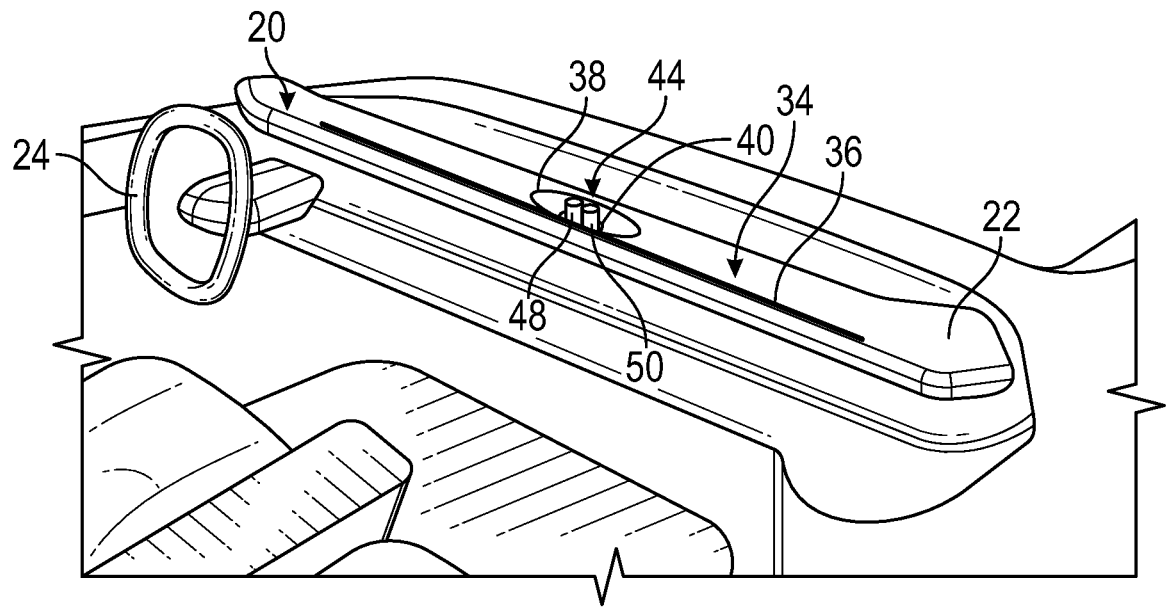
FIG. 3 depicts a screen deployment member extending through a surface of the vehicle component at the guide track, in accordance with a non-limiting example.

In accordance with a non-limiting example, vehicle component 20 houses a deployable, rollable display 30. Referring to FIGS. 2 and 3, vehicle component 20 includes a guide track 34 having a substantially linear portion 36 and a non-linear portion 38. Non-linear portion 38 may be have an oval shape. An opening 40 is positioned at an intersection of substantially linear portion 36 and non-linear portion 38. A screen deployment member 44 is selectively extendable through opening 40 as shown in FIG. 3. Screen deployment member 44 includes a first post 48 and a second post 50. A rollable display 54 (FIG. 4) is connected between first post 48 and second post 50. Rollable display 54 is spooled onto or wrapped about one, the other, or both of first post 48 and second post 50.

Figure 4:
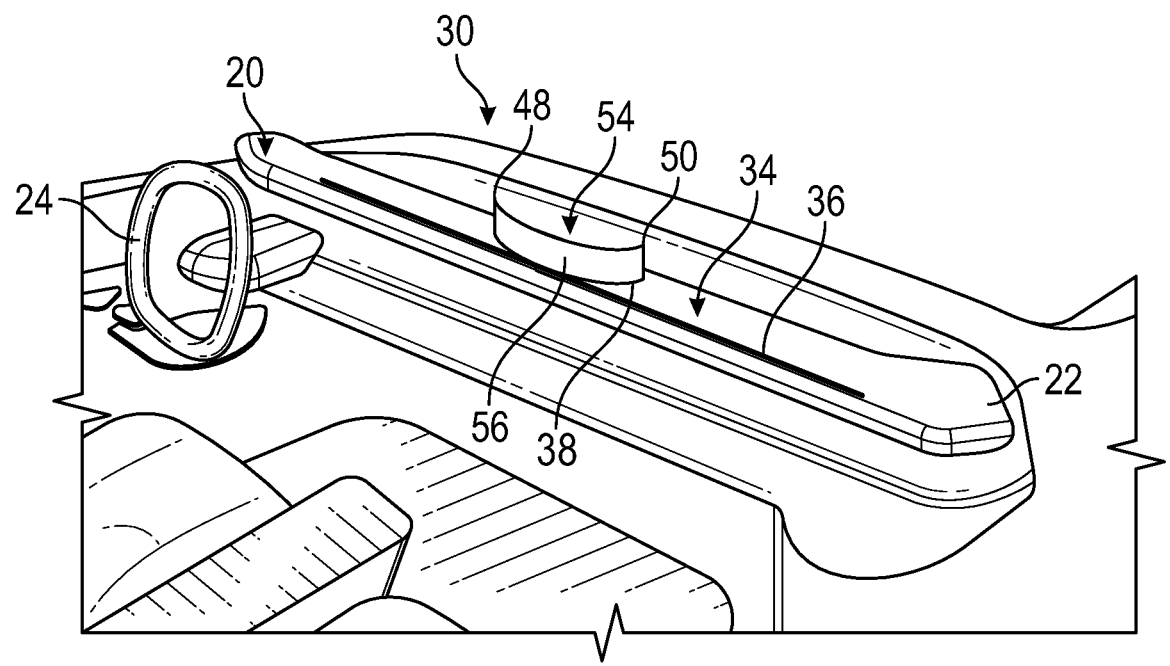
FIG. 4 depicts the deployable, rollable display along a section of a non-linear portion of the guide track, in accordance with a non-limiting example.
Figure 5:
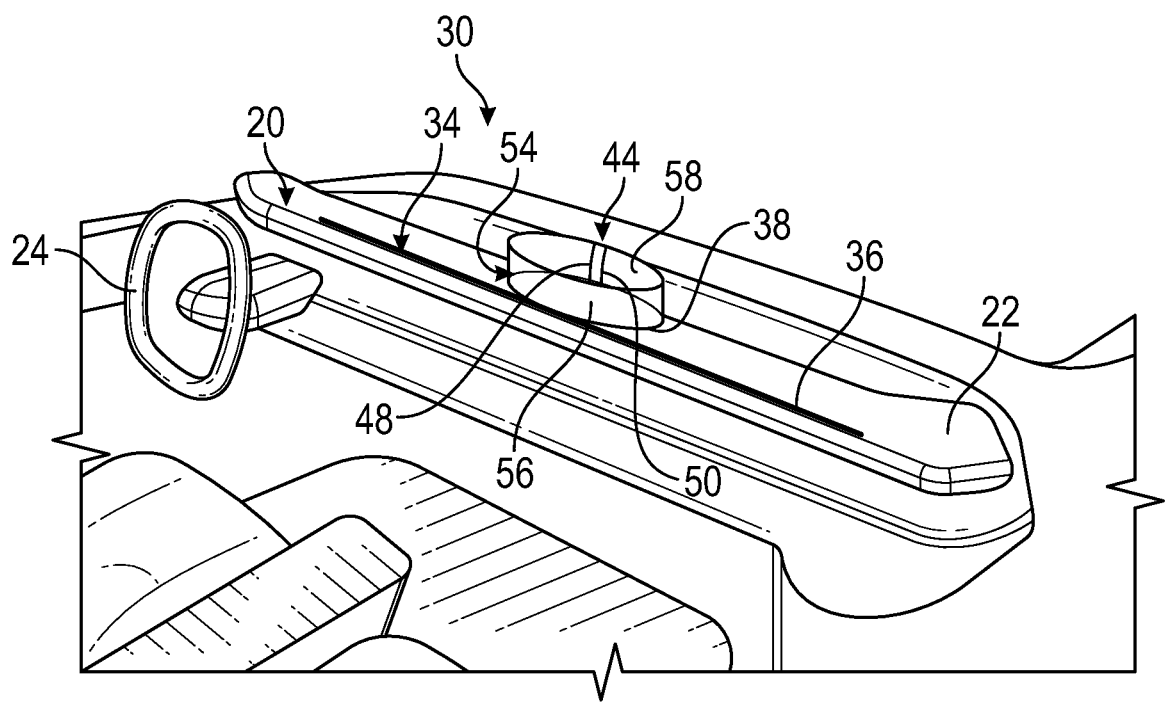
FIG. 5 depicts the deployable, rollable display entirely about the non-linear portion of the guide track, in accordance with a non-limiting example.

Rollable display 54 includes a first viewable surface 56 as shown in FIG. 4 and a second viewable surface 58 disposed behind first viewable surface 56 as shown in FIG. 5. More specifically, when rollable display is deployed along substantially linear portion 36 or an outer portion of non-linear portion 38 as shown in FIG. 4, rollable display 54 presents first viewable surface 56 to an operator or passenger of vehicle 10. When rollable display 54 is deployed entirely along non-linear portion 38 as shown in FIG. 5, rollable display 54 presents first viewable surface 56 and second viewable surface 58 to the operator or passenger. That is, second viewable surface 58 may be perceivable through or over first viewable surface 56 in accordance with a non-limiting example. When fully extended along non-linear portion 38, rollable display 54 may take on an oval-like shape that may be presented in front of a driver, a passenger, or between the driver and passenger. In a non-limiting example, the second viewable surface 58 may be transparent or opaque depending on displayed content.

Figure 6:
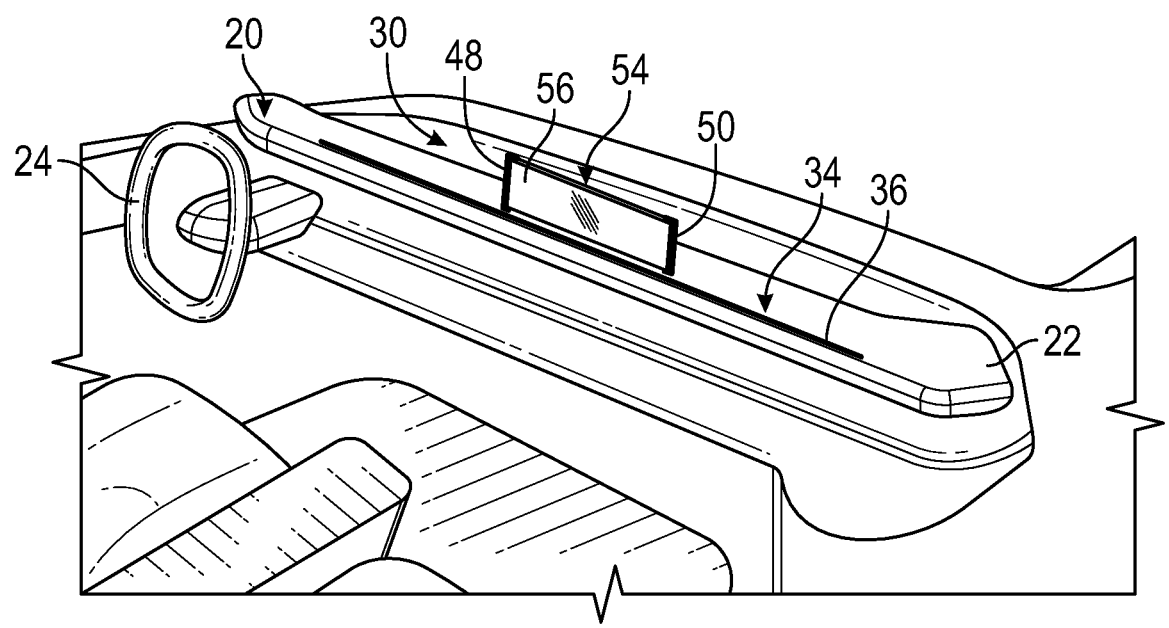
FIG. 6 depicts the deployable rollable display at a central portion of the substantially linear portion of the guide track, in accordance with a non-limiting example.
Figure 7:
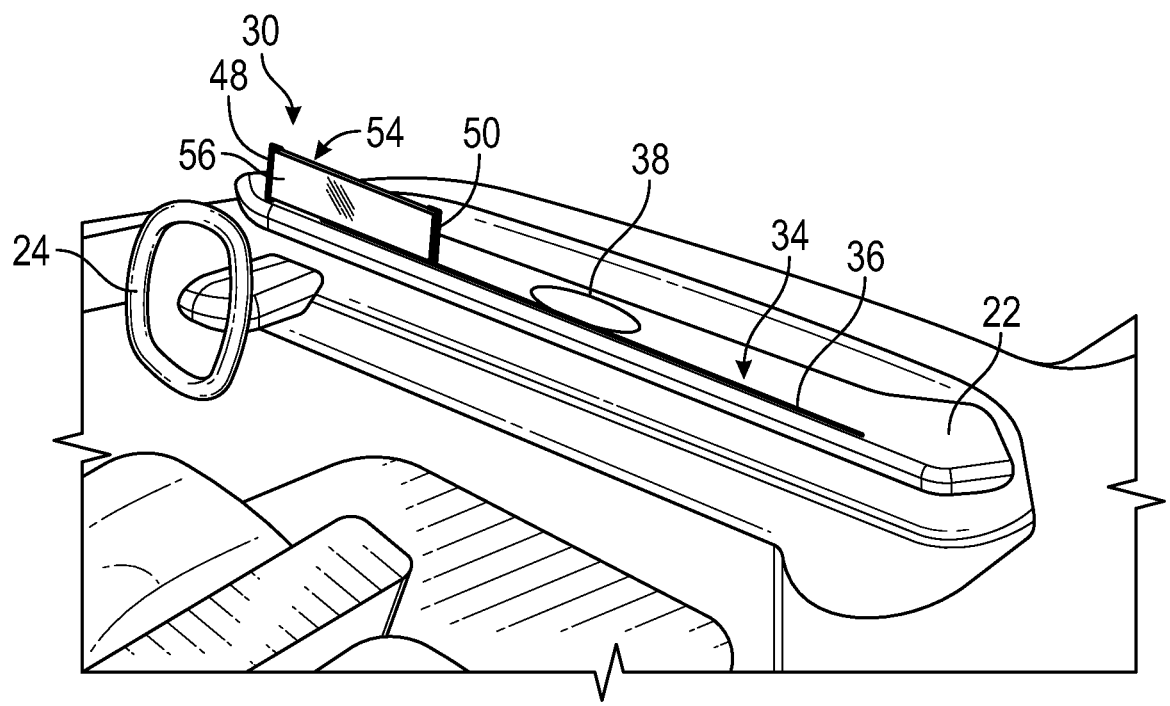
FIG. 7 depicts the deployable rollable display shifted along the substantially linear portion of the guide track, in accordance with a non-limiting example.

In FIG. 6, rollable display 54 is shown deployed along substantially linear portion 36. That is, screen deployment member 44 is extended through opening 40 and first post 48 is moved in a first direction along substantially linear portion 36 and second post 50 is moved in a second direction along substantially linear portion 36 to unspool and unfurl rollable display 54. First post 48 and second post 50 may also be moved together in the first direction, as shown in FIG. 7, or in the second direction. Further, first post 48 and second post 50 may be shifted along non-linear portion 38 as shown in FIG. 5 to unspool and unfurl rollable display 54.

Figure 8:
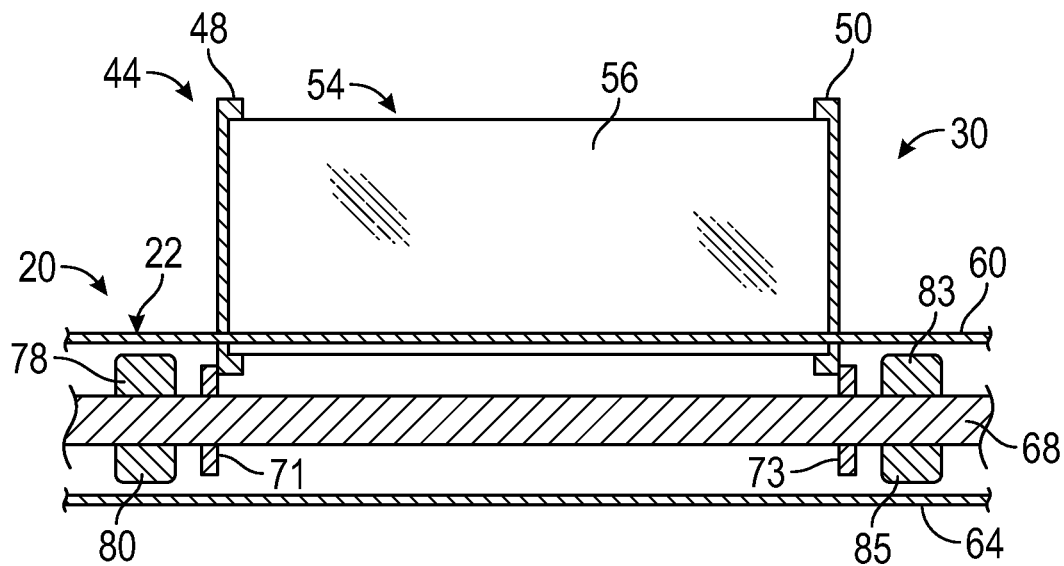
FIG. 8 depicts the deployable rollable display extending through an upper surface of the component, in accordance with a non-limiting example.
Figure 9:
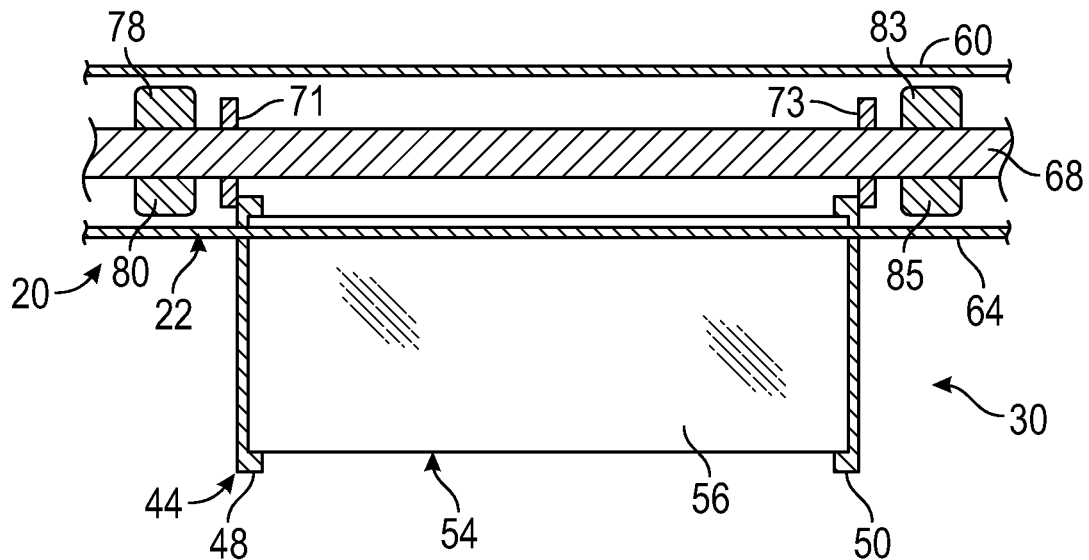
FIG. 9 depicts the deployable rollable display extending through a lower surface of the component, in accordance with a non-limiting example.

In a non-limiting example shown in FIGS. 8 and 9, vehicle component 20 includes an upper surface 60 and a lower surface 64. Rollable display 30 is deployable through upper surface 60 (FIG. 8) and lower surface 64 (FIG. 9) depending on user preferences. Vehicle component 20 houses a support bar 68 to which is slidably mounted a first actuator 71 and a second actuator 73. First actuator 71 is connected to first post 48 and second actuator 73 is connected to second post 50. First actuator 71 may deploy first post 48 through upper surface 60 and/or lower surface 64. Similarly, second actuator 73 may deploy second post 50 through upper surface 60 and/or lower surface 64. First actuator 71 and second actuator 73 may also shift first post 48 and second post 50 along guide track 34.

In a non-limiting example, a first motor 78 and a second motor 80 are connected to first actuator 71. A third motor 83 and a fourth motor 85 are connected to second actuator 73. First and third motors 78 and 83 may be selectively activated to shift corresponding ones of first post 48 and second post 50 through upper surface 60 and/or lower surface 64. Second motor 80 and fourth motor 85 may be selectively activated to shift corresponding ones of first post 48 and second post 50 along substantially linear portion 36 and/or non-linear portion 38 of guide track 34.

Figure 10:
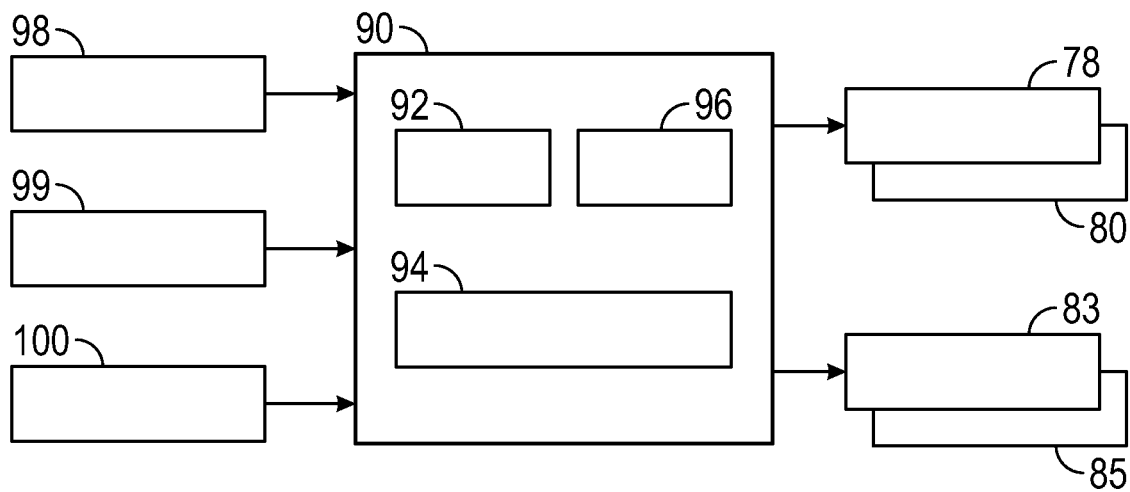
FIG. 10 depicts a block diagram illustrating a control system for the deployable rollable display, in accordance with a non-limiting example.

Reference will now follow to FIG. 10, with continued reference to FIGS. 1-9 in describing a controller 90 operable to selectively deploy and unfurl deployable, rollable display 30. Controller 90 includes a central processor unit (CPU) module 92 operatively connected to a non-volatile memory 94 that stores instructions, that may include user preferences, for operating deployable, rollable display 30. Controller 90 also includes a display controller 96 that is operatively connected to first motor 78, second motor 80, third motor 83, and fourth motor 85. Based on received inputs, CPU module 92 signals display controller 96 to deploy and unfurl rollable display 54.

In accordance with a non-limiting example, inputs to controller 90 may include an actuator 98 that may be physically activated by user such as a driver and/or a passenger of vehicle 10. Actuator 98 may be physically located within vehicle 10 and/or provided in a smart phone app associated with vehicle 10. Actuator 98 may also be embodied in a touch screen, buttons, voice control and/or hand gestures in accordance with other non-limiting examples. Other inputs may include environmental inputs 99 such as time of day/road conditions, road type, vehicle speed traffic conditions, weather conditions and the like. Based on inputs received from environmental inputs 99 and/or a specific feature selected by a user, CPU module 92 signals display controller 96 to activate deployable, rollable display 30 based on stored user preferences. Still further inputs may include an eye tracking system 100 that adjusts a height and position of rollable display, or graphics illustrated on the display, based on a perceived location/angle of a user's eyes.

At this point, it should be appreciated that non-limiting examples describe a display that may be stowed within a vehicle component and based on one or more of a direct activation and stored user preferences be deployed and unfurled. The display may take on a substantially linear form or a non-liner form and shifted along the vehicle component. In the non-linear form, multiple surfaces of the display may be perceivable. It should also be understood that while shown in combination with a vehicle dashboard or instrument cluster, the rollable display may also be selectively deployable from other vehicle components such as arm rests, center consoles, head rests, head liners, doors, and the like in accordance with other non-limiting examples.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A deployable rollable display for a vehicle comprising:
a vehicle component including at least one surface;
a guide track provided in the at least one surface;
a screen deployment member selectively shiftable through the at least one surface and along the guide track; and
a rollable display spooled onto the screen deployment member.

2. The deployable rollable display according to claim 1, wherein the guide track is substantially linear.

3. The deployable rollable display according to claim 1, wherein the guide track is non-linear.

4. The deployable rollable display according to claim 1, wherein the non-linear guide track has an oval shape.

5. The deployable rollable display according to claim 1, wherein the guide track includes a substantially linear portion and a non-linear portion.

6. The deployable rollable display according to claim 1, wherein the screen deployment member includes a first post and a second post that is moveable along the guide track relative to the first post to unspool the display.

7. The deployable rollable display according to claim 6, wherein the each of the first post and the second post is shiftable along the guide track.

8. The deployable rollable display according to claim 1, wherein the rollable display includes a first viewable surface and a second viewable surface.

9. The deployable rollable display according to claim 8, wherein the second viewable surface is perceivable through the first viewable surface.

10. The deployable rollable display according to claim 1, wherein the at least one surface is an upper surface.

11. The deployable rollable display according to claim 1, wherein the at least one surface includes a first surface defining an upper surface and a second surface defining a lower surface.

12. A vehicle comprising:
a body defining a passenger compartment;
a component positioned in the passenger compartment, the component having at least one surface;
a guide track provided in the at least one surface;
a screen deployment member selectively shiftable through the at least one surface and along the guide track; and
a rollable display spooled onto the screen deployment member.

13. The vehicle according to claim 12, wherein the guide track is substantially linear.

14. The vehicle according to claim 12, wherein the guide track is non-linear.

15. The vehicle according to claim 12, wherein the guide track includes a substantially linear portion and a non-linear portion.

16. The vehicle according to claim 12, wherein the screen deployment member includes a first post and a second post that is moveable along the guide track relative to the first post to unspool the display.

17. The vehicle according to claim 16, wherein the each of the first post and the second post is shiftable along the guide track.

18. The vehicle according to claim 12, wherein the rollable display includes a first viewable surface and a second viewable surface.

19. The vehicle according to claim 12, wherein the at least one surface is an upper surface.

20. The vehicle according to claim 12, wherein the at least one surface includes a first surface defining an upper surface and a second surface defining a lower surface.

\* \* \* \* \*